United States Patent
Jadav et al.

(10) Patent No.: US 11,968,221 B2
(45) Date of Patent: Apr. 23, 2024

(54) DYNAMICALLY FEDERATED DATA BREACH DETECTION

(71) Applicant: International Business Machines Corporation, Armonk, NY (US)

(72) Inventors: Divyesh Jadav, San Jose, CA (US); Mu Qiao, Belmont, CA (US); Eric Kevin Butler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/809,021

(22) Filed: Jun. 27, 2022

(65) Prior Publication Data
US 2023/0421586 A1  Dec. 28, 2023

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01)

(58) Field of Classification Search
CPC .... H04L 63/1425; G06N 20/00; G06N 3/088; G06N 3/09; G06N 3/02
See application file for complete search history.

(56) References Cited

U.S. PATENT DOCUMENTS

| | | | |
|---|---|---|---|
| 10,970,395 B1 | 4/2021 | Bansal | |
| 11,170,104 B1 | 11/2021 | Stickle | |
| 11,620,578 B2 * | 4/2023 | Ben-Itzhak | G06N 20/00 706/12 |
| 2018/0096261 A1 * | 4/2018 | Chu | G06N 20/20 |
| 2019/0042744 A1 | 2/2019 | Rajasekharan | |
| 2019/0324430 A1 * | 10/2019 | Herzog | G06Q 50/40 |
| 2019/0349392 A1 * | 11/2019 | Wetterwald | H04L 43/0852 |

(Continued)

OTHER PUBLICATIONS

O. A. Wahab, A. Mourad, H. Otrok and T. Taleb, "Federated Machine Learning: Survey, Multi-Level Classification, Desirable Criteria and Future Directions in Communication and Networking Systems," in IEEE Communications Surveys & Tutorials, vol. 23, No. 2, pp. 1342-1397, Secondquarter 2021. (Year: 2021).*

(Continued)

*Primary Examiner* — Kari L Schmidt
(74) *Attorney, Agent, or Firm* — Stephanie L. Carusillo

(57) ABSTRACT

A processor distributes, from a server, a trained supervised machine learning (ML) model and supervised and unsupervised feature information to a plurality of client devices; at each client device, trains the supervised ML model using local data to generate a local supervised ML model, constructs a local unsupervised ML model using the unsupervised feature information, and deploys the local supervised and unsupervised ML models; determining when a detection performance difference between the local supervised and unsupervised ML models reaches a threshold; identifies a proposed change to the supervised or unsupervised feature information; deploys the proposed change on one client device; responsive to determining the proposed change improves the detection performance of that client device, communicates the proposed change to a sampled set of client devices; and responsive to determining the proposed change improves the detection performance of a majority of the sampled set, communicates the proposed change to the server.

20 Claims, 5 Drawing Sheets

(56) References Cited

U.S. PATENT DOCUMENTS

| | | | |
|---|---|---|---|
| 2020/0358792 A1 | 11/2020 | Bazalgette | |
| 2021/0056203 A1 | 2/2021 | Qiao | |
| 2021/0105613 A1* | 4/2021 | San Miguel | H04W 12/63 |
| 2021/0117780 A1* | 4/2021 | Malik | G06F 40/205 |
| 2021/0150269 A1* | 5/2021 | Choudhury | G06V 30/1985 |
| 2021/0365831 A1* | 11/2021 | Li | G06F 18/254 |
| 2022/0076133 A1* | 3/2022 | Yang | G06N 3/044 |
| 2022/0270590 A1* | 8/2022 | Beaufays | G06N 3/084 |
| 2022/0383859 A1* | 12/2022 | Mimassi | G10L 15/16 |
| 2022/0391778 A1* | 12/2022 | Green | G06N 20/20 |
| 2022/0414539 A1* | 12/2022 | Oren | G06F 11/3447 |
| 2023/0017157 A1* | 1/2023 | Mahler | G06T 7/0012 |
| 2023/0041015 A1* | 2/2023 | Chhibber | G06N 20/00 |
| 2023/0147685 A1* | 5/2023 | Koch | G06V 30/147 |
| | | | 382/103 |
| 2023/0275915 A1* | 8/2023 | Kaul | H04L 63/1425 |
| | | | 726/23 |
| 2023/0300156 A1* | 9/2023 | Karpovsky | H04L 63/0236 |
| | | | 726/22 |
| 2023/0376026 A1* | 11/2023 | Zhang | G05B 23/027 |
| 2023/0419402 A1* | 12/2023 | Ghelichi | G06N 5/01 |

OTHER PUBLICATIONS

O. Aouedi, K. Piamrat, G. Muller and K. Singh, "Federated Semisupervised Learning for Attack Detection in Industrial Internet of Things," in IEEE Transactions on Industrial Informatics, vol. 19, No. 1, pp. 286-295, Jan. 2023. (Year: 2023).*

Verbraeken, Joost, et al. "A survey on distributed machine learning." Acm computing surveys (csur) 53.2 (2020): 1-33. (Year: 2020).*

Ciocarlie, Gabriela F., "Towards Self-Adaptive Anomaly Detection Sensors", Thesis, Columbia University, 2009, 160 Pages.

Hammond et al., "Wavelets on Graphs via Spectral Graph Theory", arXiv:0912.3848v1 [math.FA], Dec. 19, 2009, 37 Pages.

Kipf et al., "Semi-Supervised Classification With Graph Convolutional Networks", Published as a conference paper at ICLR 2017, arXiv:1609.02907v4 [cs.LG], Feb. 22, 2017, 14 Pages.

Scaife et al., "CryptoLock (and Drop It): Stopping Ransomware Attacks on User Data", 2016 IEEE 36th International Conference on Distributed Computing Systems, Nara, Japan, Jun. 27-30, 2016, 10 Pages.

* cited by examiner

DYNAMICALLY FEDERATED DATA BREACH DETECTION

BACKGROUND OF THE INVENTION

The present invention relates generally to the field of cyber security, and more particularly to dynamically federated data breach detection.

Cyber resiliency is the ability of an organization to continue to function with the least amount of disruption in the face of cyber attacks. Cyber resiliency is an end-to-end approach that brings together three critical areas—information security, business continuity, and network resilience of enterprises—to ensure organizations continue to function during cyber attacks and cyber outages. Cyber security is designed to protect systems, networks, and data from cyber crimes. Effective cyber security reduces the risk of a cyber attack and protects organizations from the deliberate exploitation of its assets. Business continuity provides the capability to resume operations when an event causes a service disruption. Plans for business continuity address natural catastrophe, accidents, and deliberate physical attacks, but now they must also support resumption of operations following cyber attack disruptions.

Ransomware, a special case of malware, has recently emerged as a major threat in cyber security. Ransomware typically operates by locking the data of the victim user to render the system inaccessible to the user, or by encrypting, overwriting, or deleting the user's files. Cyber resiliency service providers monitor abnormalities in backup snapshots to detect cyber attacks and breaches. Once an anomaly is spotted the last golden snapshot will be quickly identified and restored to ensure the organization can resume operations.

Cyber attacks are becoming more costly and more likely with the attack landscape constantly expanding. Network and infrastructure are getting more complex with cloud, mobile, remote, virtualization, and Internet of Things components. Malware can propagate to network backups and corrupt them causing long recovery times that are error prone due to manual operations.

SUMMARY

Aspects of an embodiment of the present invention disclose a method, computer program product, and computer system for dynamically federated data breach detection for cyber resilience. A processor distributes, from a server, a trained supervised machine learning model, supervised feature information for the supervised machine learning model, and unsupervised feature information for local unsupervised machine learning models to each client device of a plurality of client devices. A processor trains, at each client device, the supervised machine learning model using local data of a respective client device through transfer learning to generate a local supervised machine learning model. A processor constructs, at each client device, a local unsupervised machine learning model using the unsupervised feature information. A processor deploys, at each client device, the local supervised machine learning model and the local unsupervised machine learning model. A processor monitors a detection performance of each local supervised machine learning model and each local unsupervised machine learning model. A processor determines a detection performance difference between the local supervised machine learning models and the local unsupervised machine learning models has reached a pre-defined threshold. A processor identifies a proposed change to at least one feature of at least one of the supervised feature information and the unsupervised feature information based on a model analysis. A processor deploys the proposed change on at least one of the plurality of client devices. Responsive to determining the proposed change improves the detection performance of the at least one of the plurality of client devices, a processor communicates the proposed change to a sampled set of client devices of the plurality of client devices. Responsive to determining the proposed change improves the detection performance of a majority of the sampled set of client devices, a processor communicates the proposed change to the server.

DETAILED DESCRIPTION

Embodiments of the present invention recognize that cyber attacks are becoming more costly and more likely with the attack landscape constantly expanding. Embodiments of the present invention recognize the need to detect abnormal snapshots due to cyber attacks/breaches (e.g., a malware infection). Embodiments of the present invention provide a system and method for a dynamically federated framework to continuously update machine learning models, used to detect abnormal backup snapshots, allowing installation-specific model adaptations to operate in a privacy preserving manner. Embodiments of the present invention provide a dynamically federated method of updating a supervised machine learning model on a server. This method allows a plurality of client sites (1) to preserve transfer learning enriched local models that are specific, and usually private, (2) to benefit from the resources at the server, and (3) to have at scale evaluations at multiple client sites, thus creating a more accurate and robust defense against malware.

Embodiments of the present invention utilize a centralized supervised machine learning (ML) (e.g., Random Forest, Support Vector Machines (SVM), or a neural network) model trained on a server and then the model is distributed to client installations by a cyber resiliency service provider (CRSP). CRSP has a dedicated infrastructure and resources to train the supervised ML model based on a large amount of training data consisting of observed infection patterns of real virtual machines (VMs) exposed to malware in a sandbox environment, and this training data set can be shared with the clients. The supervised ML model on the server can capture malware infection patterns that are relatively common across clients. The model on the server is then retrained with local data at each client through transfer learning to generate a local supervised learning model. At each client, an unsupervised ML model is also constructed based on the local data. The purpose of the unsupervised ML model on each client is to capture client specific data and file system characteristics (e.g., directory depth, file type, file size, rate of change, etc.) at each client, to improve detection results by using a model ensemble of the local supervised and unsupervised models, and to help detect a performance change of the local supervised model at each client and the centralized supervised ML model on the server.

Implementation of embodiments of the invention may take a variety of forms, and exemplary implementation details are discussed subsequently with reference to the Figures.

Figure 1A:
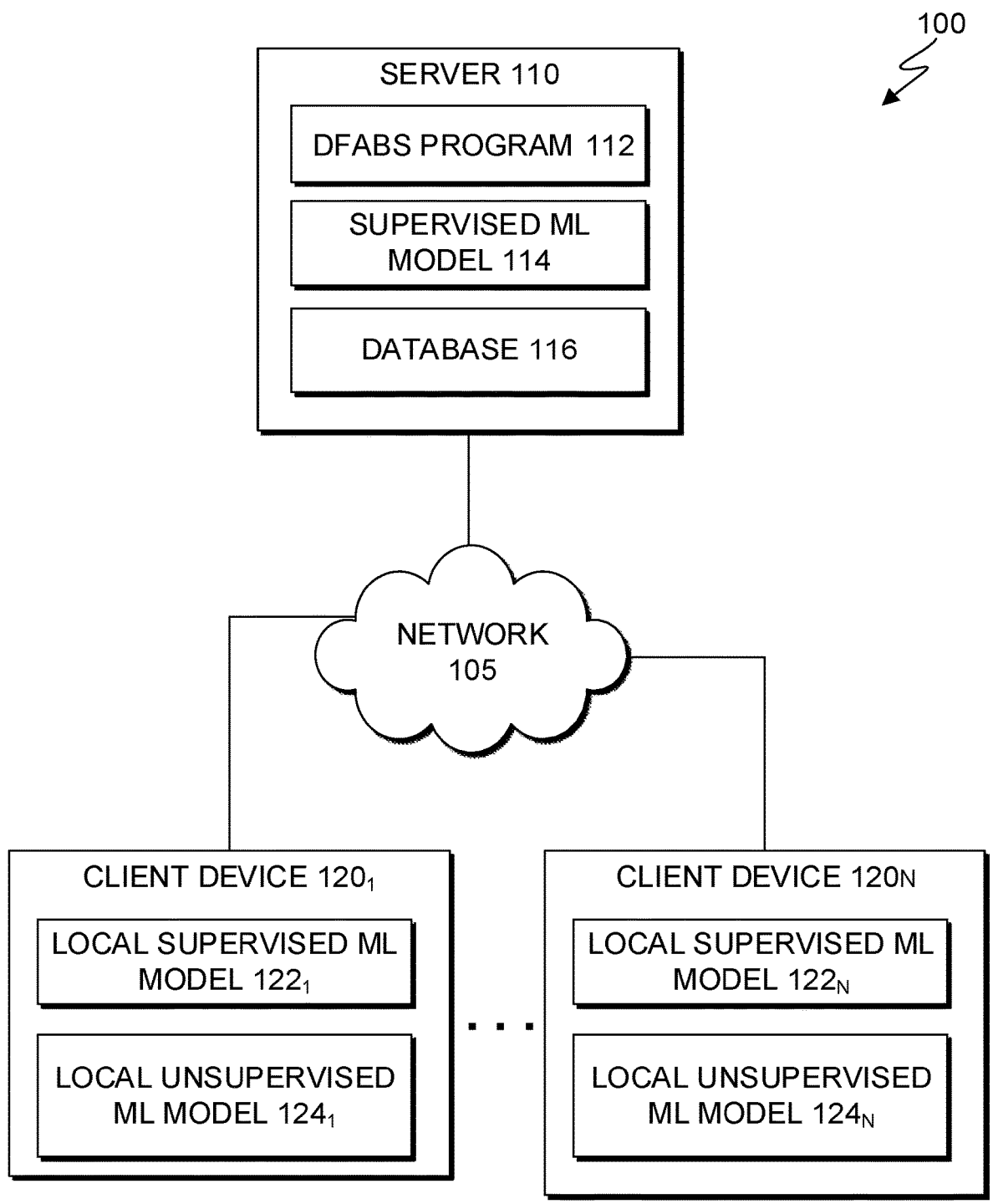
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and client devices $120_{1-N}$, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, client devices $120_{1-N}$, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with client devices $120_{1-N}$ and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes dynamically federated abnormal backup snapshot detection (DFABSD) program 112, supervised ML model 114, and database 116. In several embodiments, supervised ML model 114 can be a Support Vector Machine (SVM) based anomaly detection, a deep neural network, XGBoost, Random forest, etc. Server 110 may include internal and external hardware components, as depicted and described in further detail with respect to FIG. 3.

Dynamically federated abnormal backup snapshot detection (DFABSD) program 112 operates to perform dynamically federated abnormal backup snapshot detection for cyber resilience. In the depicted embodiment, DFABSD program 112 is a standalone program. In another embodiment, DFABSD program 112 may be integrated into another software product, e.g., a cyber security software package, or integrated into a cyber resiliency service provider (CRSP). DFABSD program 112 is depicted and described in further detail with respect to FIGS. 2A and 2B.

Database 116 operates as a repository for data received, used, and/or output by DFABSD program 112. Data received, used, and/or generated may include, but is not limited to, feature information for models, pre-defined significance threshold, proposed changes (e.g., new features, modification of features), and any other data received, used, and/or output by DFABSD program 112 and/or supervised ML model 114. Database 116 can be implemented with any type of storage device capable of storing data and configuration files that can be accessed and utilized by server 110, such as a hard disk drive, a database server, or a flash memory. In an embodiment, database 116 is accessed by DFABSD program 112 to store and/or to access the data. In the depicted embodiment, database 116 resides on server 110. In another embodiment, database 116 may reside on another computing device, server, cloud server, or spread across multiple devices elsewhere (not shown) within distributed data processing environment 100, provided that DFABSD program 112 has access to database 116.

Client devices $120_{1-N}$ each operate as a computing device associated with a user on which the user can interact with DFABSD program 112 through an application user interface (not shown). In the depicted embodiment, client devices $120_{1-N}$ each include local supervised ML model $122_i$ and local unsupervised ML model $124_i$, in which N is any integer and i refers to one instance of a model or a device. In several embodiments, local supervised ML model $122_i$ can be a Support Vector Machine (SVM) based anomaly detection, a deep neural network, XGBoost, Random forest, etc. In several embodiments, local unsupervised ML model $124_i$ can be a density-based anomaly detection (e.g., local outlier factor), clustering-based anomaly detection (e.g., K-means clustering), etc. In an embodiment, DFABSD program 112 uses the following exemplary set of features (i.e., feature information) for the local unsupervised ML model: largest depth of directory, total file count, total file size, top k file extensions ordered by file size (e.g., .pdf, .txt, .doc), top k file extensions ordered by file count (e.g., .pdf, .jpeg, .xls), total file count changed within x time period (e.g., x is {0.5, 1, 2, 4, 8, 12, 24, 48} hours). Each snapshot is represented by such a set of features. The abnormality of a snapshot can be determined by comparing its local density with the density around the clean snapshots in the local neighborhood of that snapshot based on a pre-defined threshold. A significant difference indicates that the snapshot can be abnormal. In an embodiment, client devices $120_{1-N}$ can each be a laptop computer, a tablet computer, a smart phone, a smart watch, an e-reader, smart glasses, wearable computer, or any programmable electronic device capable of communicating with various components and devices within distributed data processing environment 100, via network 105. In general, client devices $120_{1-N}$ represent one or more programmable electronic devices or combination of programmable electronic devices capable of executing machine readable program instructions and communicating with other computing devices (not shown) within distributed data processing environment 100 via a network, such as network 105.

Figure 1B:
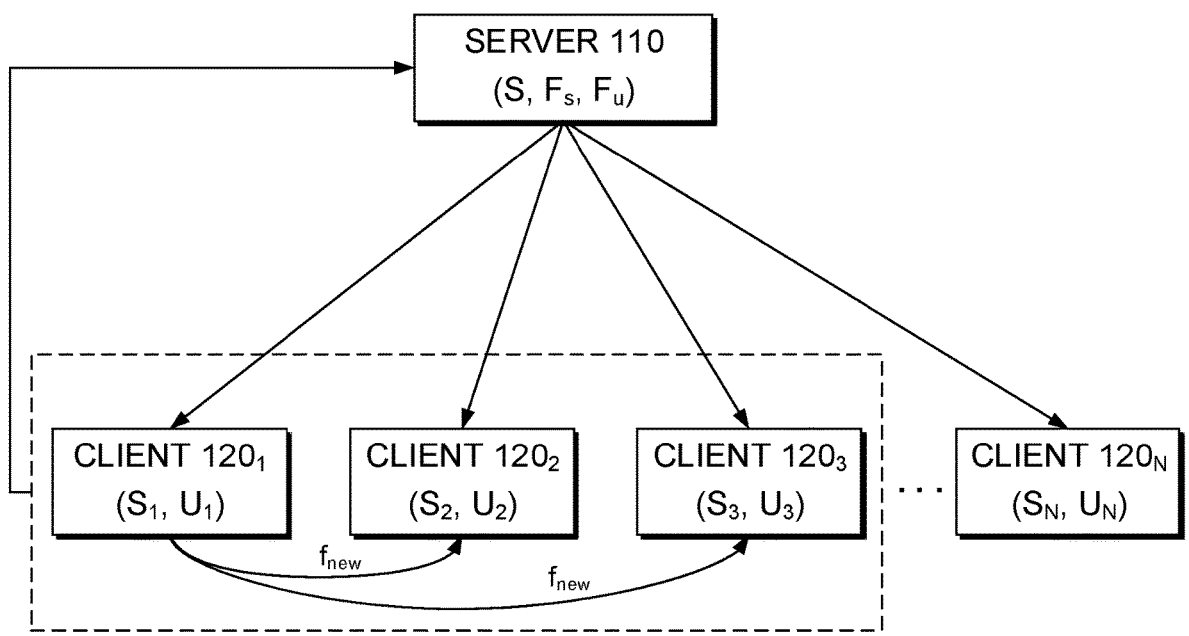
FIG. 1B is another functional block diagram illustrating the process flows of distributed data processing environment when performing a dynamically federated abnormal backup snapshot detection (DFABSD) program, in accordance with an embodiment of the present invention.

FIG. 1B is another functional block diagram illustrating the process flows of distributed data processing environment when performing DFABSD program 112, in accordance with an embodiment of the present invention. As depicted, server 110 includes supervised ML model 114 or S, feature information for the supervised ML models $F_s$ that is used by local supervised ML model $S_i$ on client devices $120_{1-N}$, and feature information for unsupervised ML models $F_u$ that is used by local unsupervised ML model $U_i$ on client devices $120_{1-N}$. Each client device $120_i$ includes local supervised ML model $S_i$ and local unsupervised ML model $U_i$.

When a performance difference between $S_i$ and $U_i$ becomes significant, e.g., $S_i$ generates more false negatives or false positives, DFABSD program 112 informs a user and requests a model analysis. The user can introduce a change to one or more features of $S_i$ and/or $U_i$, e.g., add a new feature, and then DFABSD program 112 can measure the performance change of $S_i$ and $U_i$. If the performance of $S_i$ and/or $U_i$ improves, DFABSD program 112 communicates the feature change $f_{new}$ to a sampled number of client devices $120_{1-i}$. If a majority of the sampled number of client devices $120_{1-i}$ experience a performance improvement, DFABSD program 112 communicates the change to the server and requests a general model update to supervised ML model 114 (S), and feature information update to $F_s$, and/or $F_u$. DFABSD program 112 is described in more detail below with respect to FIGS. 2A and 2B.

Figure 2A:
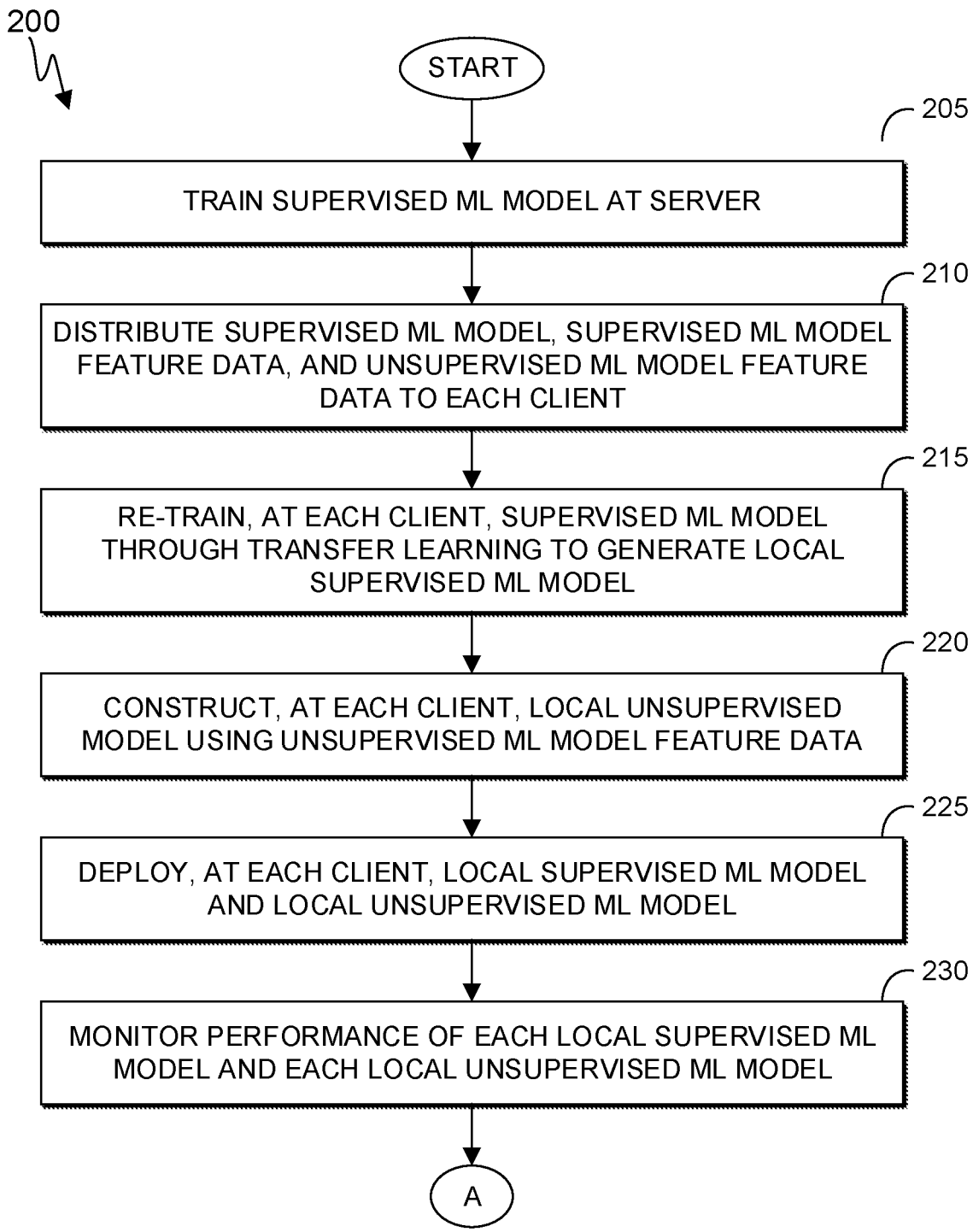
FIGS. 2A and 2B are a flowchart depicting operational steps of the DFABSD program, for dynamically federated abnormal backup snapshot detection for cyber resilience, running on a server of the distributed data processing environment of FIG. 1A in accordance with an embodiment of the present invention.
Figure 2B:
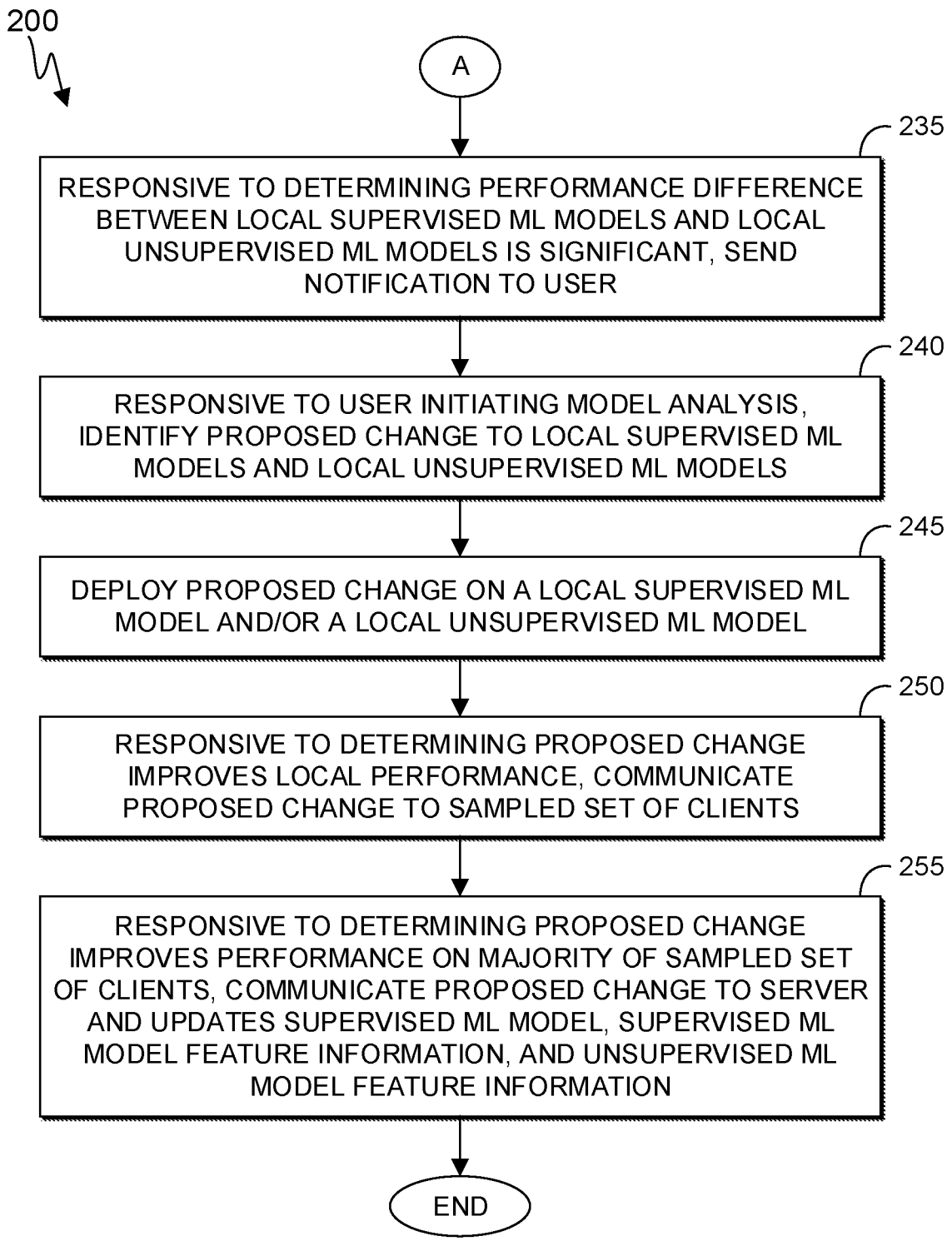

FIGS. 2A and 2B are a flowchart 200 depicting operational steps of DFABSD program 112, for dynamically federated abnormal backup snapshot detection for cyber resilience, running on server 110 of distributed data processing environment 100 of FIG. 1A in accordance with an embodiment of the present invention. It should be appreciated that the process depicted in FIGS. 2A and 2B illustrate one possible iteration of DFABSD program 112.

In step 205, DFABSD program 112 trains a supervised ML model at a server. In an embodiment, DFABSD program 112 trains a centralized supervised ML model, e.g., supervised ML model 114 on server 110. In an embodiment, DFABSD program 112 trains the centralized supervised ML model on observed infection patterns of virtual machines (VMs) exposed to malware in a sandbox environment. In an embodiment, DFABSD program 112 uses any type of supervised ML model, e.g., Random Forest, SVM, or a neural network.

In an exemplary embodiment, DFABSD program 112 uses a Random Forest model as the supervised ML model with hyperparameters of max_depth: 30, min_samples_split: 4, and n_estimators: 400. In this exemplary embodiment, DFABSD program 112 uses the following set of features (i.e., feature information) for the centralized supervised ML model: largest depth of directory, total file count, total file size, total file count difference between current snapshot and previous snapshot, total file size difference between current snapshot and previous snapshot, total file count changed within x time period (e.g., x is {0.5, 1, 2, 4, 8, 12, 24, 48} hours), top k file extensions (e.g., .pdf, .txt, .doc, .pv, etc.) ordered by file size, size of the top k file extensions, and count of the top k file extensions. These features can be input or pre-defined by a user during this step or during setup. Each snapshot is represented by such a set of features. All the infected snapshots are labeled as class 0 and all the clean snapshots are labelled as class 1. In this exemplary embodiment, DFABSD program 112 trains the supervised ML model on a training set of snapshots with 90% used for training and 10% used for testing, and uses 10-fold stratified cross validation to test effectiveness of the supervised ML model.

In step 210, DFABSD program 112 distributes the supervised ML model, supervised ML model feature information, and unsupervised ML model feature information to each client device of a plurality of client devices. In an embodiment, DFABSD program 112 enables a user to input the supervised ML model feature information and unsupervised ML model feature information. Once the feature information is received from the user or from a database of the server, e.g., database 116 of server 110, DFABSD program 112 distributes the supervised ML model, supervised ML model feature information, and unsupervised ML model feature information to each client device of a plurality of client devices. The supervised feature information is a set of features used to train and/or construct the supervised machine learning model (and later the local supervised machine learning models). The unsupervised feature information is a set of features used to construct the local unsupervised machine learning models.

In step 215, DFABSD program 112 re-trains, at each client device, the supervised ML model through transfer learning to generate a local supervised ML model. In an embodiment, DFABSD program 112 re-trains, at each client device, the supervised ML model using local data of the respective client device through transfer learning to generate the local supervised ML model. In an embodiment in which the supervised ML model is a neural network, DFABSD program 112 re-trains, at each client device, the local supervised ML model through transfer learning by fine-tuning the local model with client data by only training its parameters of the last layer of the neural network while keeping remaining parameters fixed.

In step 220, DFABSD program 112 constructs, at each client device, a local unsupervised ML model with the unsupervised ML model feature information. In an embodiment, DFABSD program 112 constructs the local unsupervised ML model using local data and the unsupervised ML model feature information stored on the server.

In step 225, DFABSD program 112 deploys, at each client device, the local supervised ML model and the local unsupervised ML model. In an embodiment, DFABSD program 112 deploys, at each client device, an ensemble of the local supervised ML model and the local unsupervised ML model for anomaly detection. In an embodiment, an anomaly is detected at a client device only if both local supervised ML model and local unsupervised ML model detect the anomaly, i.e., an abnormal backup snapshot which indicates a data breach. In another embodiment, an anomaly is detected at a client device if a weighted combination of the output of local supervised ML model and the output of local unsupervised ML model is above a pre-defined threshold. The weights on local supervised ML model and local unsupervised ML model are pre-defined by the user.

In step 230, DFABSD program 112 monitors a detection performance of each local supervised ML model and each local unsupervised ML model. In an embodiment, DFABSD program 112 monitors the detection performance of each local supervised ML model and each local unsupervised ML model separately, in which the detection performance is based on detecting data breaches (i.e., anomalies) on the respective client devices.

In step 235, responsive to DFABSD program 112 determining a performance difference between a plurality of local supervised ML models and a plurality of local unsupervised ML models is significant, i.e., has reached a pre-defined threshold, DFABSD program 112 sends a notification to a user. If the performance difference between the local supervised ML models and the local unsupervised ML models reaches a pre-defined threshold of significance, e.g., the local supervised ML models generate a pre-defined threshold more false negatives or false positives than the local unsupervised ML models, DFABSD program 112 sends a notification to a user to request a model analysis.

In step 240, responsive to the user initiating a model analysis, DFABSD program 112 identifies a proposed change for the plurality of local supervised ML models and the plurality of local unsupervised ML models. In an embodiment, DFABSD program 112 identifies a proposed change based on the model analysis, e.g., addition of a new feature or modification of an existing feature, for the plurality of local supervised ML models and/or the plurality of local unsupervised ML models.

In step 245, DFABSD program 112 deploys the proposed change on at least one of the local supervised ML models and/or at least one of the unsupervised ML models. In an embodiment, DFABSD program 112 deploys the proposed change on at least one of the local supervised ML models and/or at least one of the unsupervised ML models of at least one of the client devices. In an embodiment, after deploying the proposed change, DFABSD program 112 monitors a local performance of the at least one of the local supervised ML models and/or at least one of the unsupervised ML models.

In step 250 responsive to DFABSD program 112 determining the proposed change improves local performance, DFABSD program 112 communicates the proposed change to a sampled set of client devices of the plurality of client devices. In an embodiment, responsive to DFABSD program 112 determining that the proposed change improves performance above a pre-defined threshold on the at least one local supervised ML model and/or the at least one unsupervised ML model, DFABSD program 112 communicates the proposed change to a sampled set of client devices of the plurality of client devices, in which the sampled set is a pre-defined amount.

In step 255, responsive to DFABSD program 112 determining the proposed change improves performance for a majority of the sampled set of client devices, DFABSD program 112 communicates the proposed change to the server and updates the supervised ML model, the supervised model feature information, and the unsupervised model feature information based on the proposed change. In an embodiment, responsive to DFABSD program 112 determining the proposed change improves performance, i.e., reaches a pre-defined performance threshold, for a majority of the sampled set of client devices, DFABSD program 112 communicates the proposed change to the server and updates the supervised ML model, the supervised model feature information, and the unsupervised model feature information based on the proposed change. The supervised ML model is updated by training the model with the new feature information.

Figure 3:
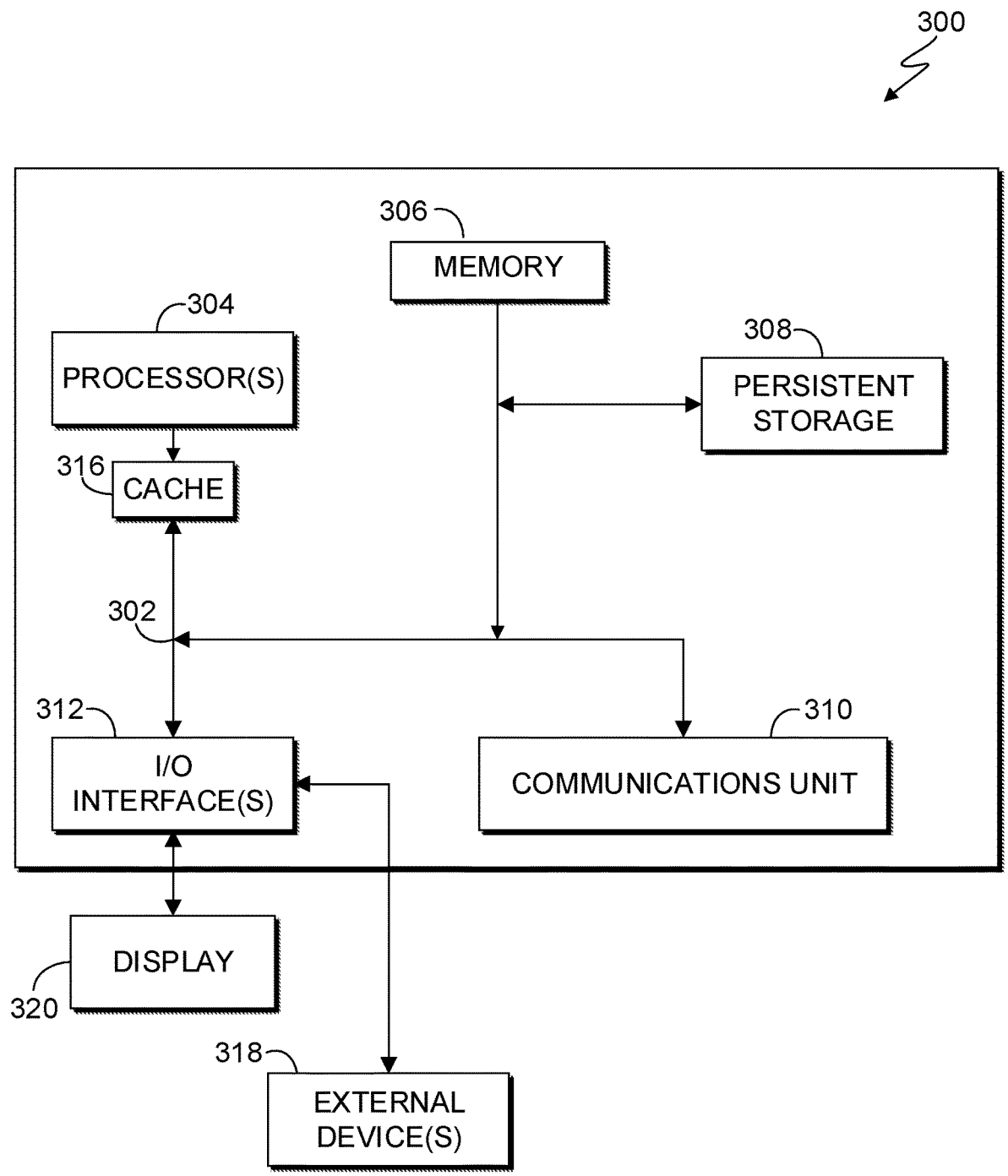
FIG. 3 depicts a block diagram of components of the server of the distributed data processing environment of FIG. 1A, for running the DFABSD program, in accordance with an embodiment of the present invention.

FIG. 3 depicts a block diagram of components of computing device 300, suitable for server 110 running emission source locator program 112 within distributed data processing environment 100 of FIG. 1A, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   distributing, by one or more processors, from a server, a supervised machine learning model, supervised feature information for the supervised machine learning model, and unsupervised feature information for local unsupervised machine learning models to each client device of a plurality of client devices;
   training, by the one or more processors, at each client device, the supervised machine learning model using local data of a respective client device through transfer learning to generate a local supervised machine learning model;
   constructing, by the one or more processors, at each client device, a local unsupervised machine learning model using the unsupervised feature information;
   deploying, by the one or more processors, at each client device, the local supervised machine learning model and the local unsupervised machine learning model;
   monitoring, by the one or more processors, a detection performance of each local supervised machine learning model and each local unsupervised machine learning model;
   determining, by the one or more processors, a detection performance difference between local supervised machine learning models and the local unsupervised machine learning models has reached a pre-defined threshold;
   identifying, by the one or more processors, a proposed change to at least one feature of at least one of the supervised feature information and the unsupervised feature information based on a model analysis;
   deploying, by the one or more processors, the proposed change on at least one of the plurality of client devices;
   responsive to determining the proposed change improves the detection performance of the at least one of the plurality of client devices, communicating, by the one or more processors, the proposed change to a sampled set of client devices of the plurality of client devices; and
   responsive to determining the proposed change improves the detection performance of a majority of the sampled set of client devices, communicating, by the one or more processors, the proposed change to the server.

2. The computer-implemented method of claim 1, further comprising: training, by the one or more processors, the supervised machine learning model on the server using the supervised feature information pre-defined by a user.

3. The computer-implemented method of claim 1, wherein the detection performance is related to detection of anomalies at each client device of the plurality of client devices, and wherein an anomaly is detected at a client device if, on the respective client device, a weighted combination of a first output of the respective local supervised machine learning model and a second output of the respective local unsupervised machine learning model is above a second pre-defined threshold.

4. The computer-implemented method of claim 1, wherein the detection performance is related to detection of anomalies at each client device of the plurality of client devices, and wherein an anomaly is detected only if, on the respective client device, both the respective local supervised machine learning model and the respective local unsupervised machine learning model detect the anomaly.

5. The computer-implemented method of claim 1, wherein determining the detection performance difference between the local supervised machine learning models and the local unsupervised machine learning models has reached the pre-defined threshold further comprises:
   responsive to determining the detection performance difference between the local supervised machine learning models and the local unsupervised machine learning models has reached the pre-defined threshold, sending, by the one or more processors, a notification to a user requesting the user initiate the model analysis.

6. The computer-implemented method of claim 1, wherein the proposed change is to be deployed to at least one of the supervised feature information and the unsupervised feature information, and wherein the proposed change is selected from the group consisting of adding a new feature and modifying an existing feature.

7. The computer-implemented method of claim 1, wherein deploying, at each client device, the local supervised machine learning model and the local unsupervised machine learning model further comprises:
   deploying, by the one or more processors, at each client device, an ensemble of the local supervised machine learning model and the local unsupervised machine learning model for anomaly detection.

8. The computer-implemented method of claim 1, wherein communicating the proposed change to the server further comprises:
   responsive to the proposed change being associated with a supervised feature, updating, by the one or more processors, the supervised feature information and the supervised machine learning model on the server by training the supervised machine learning model with the supervised feature; and
   responsive to the proposed change being associated with an unsupervised feature, updating, by the one or more processors, the unsupervised feature information based on the unsupervised feature.

9. A computer program product comprising:
   one or more computer readable storage media and program instructions collectively stored on the one or more computer readable storage media, the stored program instructions comprising:
   program instructions to distribute, from a server, a supervised machine learning model, supervised feature information for the supervised machine learning model, and unsupervised feature information for local unsupervised machine learning models to each client device of a plurality of client devices;
   program instructions to train, at each client device, the supervised machine learning model using local data of a respective client device through transfer learning to generate a local supervised machine learning model;
   program instructions to construct, at each client device, a local unsupervised machine learning model using the unsupervised feature information;
   program instructions to deploy, at each client device, the local supervised machine learning model and the local unsupervised machine learning model;
   program instructions to monitor a detection performance of each local supervised machine learning model and each local unsupervised machine learning model;

program instructions to determine a detection performance difference between the local supervised machine learning models and the local unsupervised machine learning models has reached a pre-defined threshold;
program instructions to identify a proposed change to at least one feature of at least one of the supervised feature information and the unsupervised feature information based on a model analysis;
program instructions to deploy the proposed change on at least one of the plurality of client devices;
program instructions to, responsive to determining the proposed change improves the detection performance of the at least one of the plurality of client devices, communicate the proposed change to a sampled set of client devices of the plurality of client devices; and
program instructions to, responsive to determining the proposed change improves the detection performance of a majority of the sampled set of client devices, communicate the proposed change to the server.

10. The computer program product of claim 9, further comprising:
program instructions to train the supervised machine learning model on the server using the supervised feature information pre-defined by a user.

11. The computer program product of claim 9, wherein the detection performance is related to detection of anomalies at each client device of the plurality of client devices, and wherein an anomaly is detected at a client device if, on the respective client device, a weighted combination of a first output of the respective local supervised machine learning model and a second output of the respective local unsupervised machine learning model is above a second pre-defined threshold.

12. The computer program product of claim 9, wherein the detection performance is related to detection of anomalies at each client device of the plurality of client devices, and wherein an anomaly is detected only if, on the respective client device, both the respective local supervised machine learning model and the respective local unsupervised machine learning model detect the anomaly.

13. The computer program product of claim 9, wherein the program instructions to determine the detection performance difference between the local supervised machine learning models and the local unsupervised machine learning models has reached the pre-defined threshold further comprise:
program instructions to, responsive to determining the detection performance difference between the local supervised machine learning models and the local unsupervised machine learning models has reached the pre-defined threshold, send a notification to a user requesting the user initiate the model analysis.

14. The computer program product of claim 9, wherein the proposed change is to be deployed to at least one of the supervised feature information and the unsupervised feature information, and wherein the proposed change is selected from the group consisting of adding a new feature and modifying an existing feature.

15. The computer program product of claim 9, wherein the program instructions to deploy, at each client device, the local supervised machine learning model and the local unsupervised machine learning model further comprise:
program instructions to deploy, at each client device, an ensemble of the local supervised machine learning model and the local unsupervised machine learning model for anomaly detection.

16. The computer program product of claim 9, wherein the program instructions to communicate the proposed change to the server further comprise:
program instructions to, responsive to the proposed change being associated with a supervised feature, update the supervised feature information and the supervised machine learning model on the server by training the supervised machine learning model with the supervised feature; and
program instructions to, responsive to the proposed change being associated with an unsupervised feature, update the unsupervised feature information based on the unsupervised feature.

17. A computer system comprising:
one or more computer processors;
one or more computer readable storage media;
program instructions collectively stored on the one or more computer readable storage media for execution by at least one of the one or more computer processors, the stored program instructions comprising:
program instructions to distribute, from a server, a supervised machine learning model, supervised feature information for the supervised machine learning model, and unsupervised feature information for local unsupervised machine learning models to each client device of a plurality of client devices;
program instructions to train, at each client device, the supervised machine learning model using local data of a respective client device through transfer learning to generate a local supervised machine learning model;
program instructions to construct, at each client device, a local unsupervised machine learning model using the unsupervised feature information;
program instructions to deploy, at each client device, the local supervised machine learning model and the local unsupervised machine learning model;
program instructions to monitor a detection performance of each local supervised machine learning model and each local unsupervised machine learning model;
program instructions to determine a detection performance difference between the local supervised machine learning models and the local unsupervised machine learning models has reached a pre-defined threshold;
program instructions to identify a proposed change to at least one feature of at least one of the supervised feature information and the unsupervised feature information based on a model analysis;
program instructions to deploy the proposed change on at least one of the plurality of client devices;
program instructions to, responsive to determining the proposed change improves the detection performance of the at least one of the plurality of client devices, communicate the proposed change to a sampled set of client devices of the plurality of client devices; and
program instructions to, responsive to determining the proposed change improves the detection performance of a majority of the sampled set of client devices, communicate the proposed change to the server.

18. The computer system of claim 17, further comprising:
program instructions to train the supervised machine learning model on the server using the supervised feature information pre-defined by a user.

19. The computer system of claim 17, wherein the detection performance is related to detection of anomalies at each client device of the plurality of client devices, and wherein an anomaly is detected at a client device if, on the respective client device, a weighted combination of a first output of the respective local supervised machine learning model and a second output of the respective local unsupervised machine learning model is above a second pre-defined threshold.

20. The computer system of claim 17, wherein the detection performance is related to detection of anomalies at each client device of the plurality of client devices, and wherein an anomaly is detected only if, on the respective client device, both the respective local supervised machine learning model and the respective local unsupervised machine learning model detect the anomaly.

* * * * *